United States Patent
Safstrom

(10) Patent No.: US 11,460,578 B2
(45) Date of Patent: Oct. 4, 2022

(54) 3D LIDAR SENSING UNIT WITH OSCILLATING AXIS OF ROTATION FOR AUTONOMOUS DRIVING

(71) Applicant: Robert Bosch GmbH, Stuttgart (DE)

(72) Inventor: David Frederick Safstrom, Toledo, OH (US)

(73) Assignee: Robert Bosch GmbH, Stuttgart (DE)

( * ) Notice: Subject to any disclaimer, the term of this patent is extended or adjusted under 35 U.S.C. 154(b) by 705 days.

(21) Appl. No.: 16/506,198

(22) Filed: Jul. 9, 2019

(65) Prior Publication Data

US 2020/0209397 A1 Jul. 2, 2020

Related U.S. Application Data

(60) Provisional application No. 62/786,034, filed on Dec. 28, 2018.

(51) Int. Cl.
*G01S 17/87* (2020.01)
*G01S 7/4911* (2020.01)
*G01S 17/89* (2020.01)
*G01S 17/931* (2020.01)

(52) U.S. Cl.
CPC ............ *G01S 17/87* (2013.01); *G01S 7/4911* (2013.01); *G01S 17/89* (2013.01); *G01S 17/931* (2020.01)

(58) Field of Classification Search
CPC ......... G01S 17/88; G01S 17/89; G01S 17/931
See application file for complete search history.

(56) References Cited

U.S. PATENT DOCUMENTS

| | | | | |
|---|---|---|---|---|
| 3,039,096 A | * | 6/1962 | Maurits | H01Q 1/18 343/766 |
| 5,249,157 A | * | 9/1993 | Taylor | G01S 7/4817 342/107 |
| 5,808,728 A | * | 9/1998 | Uehara | G01S 17/931 340/904 |
| 5,864,391 A | * | 1/1999 | Hosokawa | G01S 17/04 356/5.01 |
| 8,836,922 B1 | * | 9/2014 | Pennecot | G01S 7/4815 356/9 |
| 9,063,549 B1 | * | 6/2015 | Pennecot | G01S 17/931 |
| 9,128,190 B1 | * | 9/2015 | Ulrich | G02B 26/08 |

(Continued)

*Primary Examiner* — Peter M Bythrow

(74) *Attorney, Agent, or Firm* — Michael Best & Friedrich LLP

(57) ABSTRACT

A method and system for sensing objects disposed about a vehicle includes LIDAR sensors in a LIDAR sensing unit mounted above the vehicle. The system includes outputting a plurality of laser beams from lasers while rotating the LIDAR sensing unit and simultaneously oscillating or changing an axis of rotation for the LIDAR sensing unit. The LIDAR sensors receive a reflection of the laser beams and convert optical signals to electrical signals. An electronic processor is configured to determine a presence or absence of objects from the electrical signals and provide a warning indication or control movement of the vehicle in response to detection of objects. The oscillating of the LIDAR sensing unit causes the laser beams to change an angle with respect to horizontal during rotation. The change in oscillation or offset angle for an axis of rotation is accounted for by the electronic processor to map the presence of objects. An autonomous vehicle is controlled based on the sensed objects or a warning is provided.

16 Claims, 9 Drawing Sheets

(56) References Cited

U.S. PATENT DOCUMENTS

| | | | |
|---|---|---|---|
| 10,033,456 B2* | 7/2018 | Rosenband | H04B 7/0805 |
| 10,324,170 B1* | 6/2019 | Engberg, Jr. | G01S 17/89 |
| 10,551,501 B1* | 2/2020 | LaChapelle | G01S 7/4818 |
| 2005/0024625 A1* | 2/2005 | Mori | G01S 17/42 |
| | | | 356/4.01 |
| 2005/0246065 A1* | 11/2005 | Ricard | G01S 17/931 |
| | | | 700/258 |
| 2007/0219720 A1* | 9/2007 | Trepagnier | G05D 1/0278 |
| | | | 701/300 |
| 2010/0165323 A1* | 7/2010 | Fiess | G01S 7/4817 |
| | | | 356/3 |
| 2016/0282468 A1* | 9/2016 | Gruver | G01S 7/4813 |
| 2016/0291134 A1* | 10/2016 | Droz | G01S 17/931 |
| 2018/0031706 A1* | 2/2018 | Delp | G01S 17/931 |
| 2018/0188361 A1* | 7/2018 | Berger | G01S 17/931 |
| 2018/0231640 A1* | 8/2018 | Han | G01S 17/10 |
| 2018/0284237 A1* | 10/2018 | Campbell | G01S 17/931 |
| 2018/0329037 A1* | 11/2018 | Bozchalooi | G01S 7/4815 |
| 2019/0018416 A1* | 1/2019 | Gassend | G05D 1/0231 |
| 2019/0101627 A1* | 4/2019 | Hansson | G01S 17/04 |
| 2019/0107623 A1* | 4/2019 | Campbell | G02B 26/101 |
| 2019/0137610 A1* | 5/2019 | Li | G01S 17/931 |
| 2019/0154816 A1* | 5/2019 | Hughes | G01S 7/497 |
| 2019/0154889 A1* | 5/2019 | McWhirter | H01L 27/14643 |
| 2020/0025923 A1* | 1/2020 | Eichenholz | G01S 17/89 |

* cited by examiner

3D LIDAR SENSING UNIT WITH OSCILLATING AXIS OF ROTATION FOR AUTONOMOUS DRIVING

RELATED APPLICATIONS

This Application claims priority from U.S. provisional application 62/786,034 filed Dec. 28, 2018, the disclosure of which is hereby incorporated by reference herein.

BACKGROUND

A spinning three dimensional (3D) light detection and ranging (LIDAR) sensing unit has a plurality of LIDAR sensors. When a vehicle is at a standstill, the LIDAR sensing unit is mapping concentric circles around the vehicle. However, objects in areas between the circles are unknown.

Current LIDAR sensing units have a plurality of expensive LIDAR sensors with a separation angle as low as 0.1 to 0.5 degrees. Lower cost LIDAR sensors feature a separation angle of 2 degrees or greater. The problem is creating a high-resolution 3D map of vehicle surroundings without requiring as many expensive LIDAR sensors that rely on very tightly spaced laser beams.

SUMMARY

One aspect of the embodiments, is to oscillate or move the axis of rotation off center for a LIDAR sensing unit. The motion will create spirals rather than circles, especially when a vehicle is in a stationary position. Thus, the arrangement scans additional areas to improve mapping resolution without requiring additional LIDAR sensors in a LIDAR sensing unit.

One aspect of this arrangement is improved resolution of 3D spinning LIDAR sensors. In addition, one could use a lower cost LIDAR sensing unit with larger separation angle, oscillate or shift the axis of rotation, and produce a mapping resolution of a much more expensive LIDAR sensing unit with fewer LIDAR sensors.

One embodiment is directed to a method for sensing objects disposed about a vehicle that includes a plurality of LIDAR sensors and a plurality of LIDAR lasers in a LIDAR sensing unit mounted above the vehicle for autonomous driving. The method includes outputting a plurality of laser beams from the plurality of LIDAR lasers while rotating the LIDAR sensing unit about the vehicle and simultaneously effectively oscillating an axis of rotation of the LIDAR sensing unit, and receiving a reflection of the plurality of the laser beams with the plurality of LIDAR sensors that receive the reflected laser beams and convert optical signals to electrical signals. The method includes determining a presence or absence of objects from the electrical signals, and providing a warning indication to a vehicle operator or controlling movement of the vehicle in response to detection of objects in a path of the vehicle, wherein the effective oscillating of the axis of rotation of the LIDAR sensing unit causes the plurality of the laser beams to change an oscillation angle vertically so that the laser beams move both vertically and horizontally during the rotation about the vehicle.

In another embodiment, an object sensing system for a vehicle comprises a LIDAR sensing unit including: at least three lasers for outputting at least three laser beams, at least three LIDAR sensors mounted above the vehicle, the at least three LIDAR sensors receiving a reflection of the laser beams and converting optical signals to electrical signals, and a LIDAR electronic processor. The LIDAR electronic processor is configured to operate the at least three lasers to provide the at least three laser beams, and operate a rotary and oscillation control to rotate and simultaneously oscillate an axis of rotation of the LIDAR sensing unit. The LIDAR electronic processor is also configured to receive the electrical signals from the at least three LIDAR sensors and, in combination with the oscillations of the LIDAR sensing unit, determine a presence or an absence of objects from the electrical signals and a mapping location of objects based on the angle of the LIDAR sensors and an offset or oscillation angle for the axis of rotation of the LIDAR sensing unit. The LIDAR electronic processor is also configured to provide a warning signal to at least one of a vehicle warning indicator and an autonomous vehicle controller in response to detection of objects in a path of the vehicle.

Other aspects of the invention will become apparent by consideration of the detailed description and accompanying drawings.

DETAILED DESCRIPTION

Before any embodiments are explained in detail, it is to be understood that the arrangements are not limited in their application to the details of construction and the arrangement of components set forth in the following description or illustrated in the following drawings. Other embodiments are capable of being practiced or of being carried out in various ways.

Figure 1:
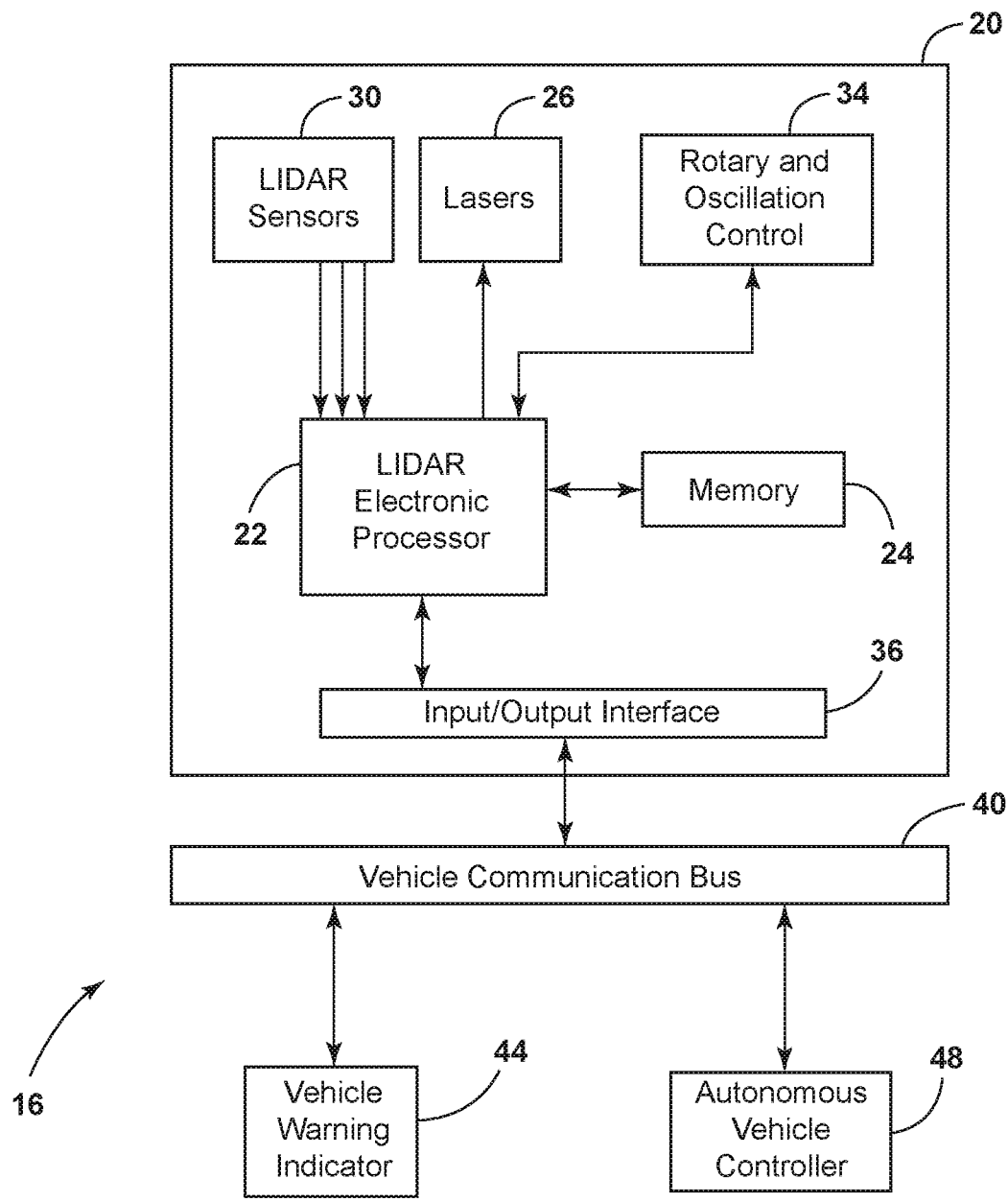
FIG. 1 is a block diagram of an autonomous vehicle control system including a LIDAR sensing unit, according to some embodiments.

FIG. 1 illustrates an autonomous vehicle control system 16 that includes an object sensing system having a LIDAR sensing unit 20 for a vehicle. The LIDAR sensing unit 20 includes a LIDAR electronic processor 22 and one or more non-transitory, computer-readable memory modules. In the example of FIG. 1, the LIDAR sensing unit 20 includes a random access memory ("RAM") and/or a read-only memory ("ROM") module (memory 24) for storing and providing information to the LIDAR electronic processor 22. The LIDAR sensing unit 20 also includes a plurality of lasers 26 for outputting vertically spaced laser beams.

LIDAR sensors 30 are also provided for receiving reflections from the lasers 26 to determine a presence of objects near the vehicle.

In the FIG. 1 embodiment, the LIDAR sensing unit 20 also includes a rotary and oscillation control 34 controlled by the LIDAR electronic processor 22 for rotating and oscillating the LIDAR sensing unit 20 about an axis of rotation thereof. The LIDAR sensing unit 20 also includes an input/output interface 36 that transmits and receives data over a vehicle communication bus 40. The vehicle communication bus 40 can be a controller area network ("CAN") bus, a CAN-FD (flexible data-rate) bus, a FlexRay bus or the like. The LIDAR sensing unit 20 can include multiple processors, additional computer-readable memory modules, multiple I/O interfaces, and/or additional components or modules (e.g., hardware, software, or a combination thereof).

The electronic processor 22 of the LIDAR sensing unit 20 receives information from the input/output interface 36 and processes the information by executing instructions for one or more software modules (which may also be referred to as a "controller" or "controllers") stored to a memory module, such as the memory 24. The electronic processor 22 stores information to and retrieves information from the memory 24 (e.g., information received from other vehicle subsystems or sensors through the vehicle communication bus 40 and information generated by modules executed by the electronic processor 22). The non-transitory computer readable memory 24 of the LIDAR sensing unit 20 include volatile memory, non-volatile memory, or a combination thereof and, in various constructions, may also store operating system software, applications/instructions data, and combinations thereof. The input/output interface 36 may also provide a wireless or optical connection that enables the devices shown in FIG. 1 to communicate using network communications protocols, for example, the Ethernet.

Various other vehicle subsystems, are also connected to the vehicle communication bus 40 to communicate with the LIDAR sensing unit 20, including various vehicle sensors, and the other vehicle subsystems. For example, a vehicle warning indicator 44 receives and indicates the presence of objects in path of a vehicle. An autonomous vehicle controller 48 receives information regarding objects in a vehicle path and operates to avoid the objects by automatically controlling a vehicle when necessary.

Figure 2:
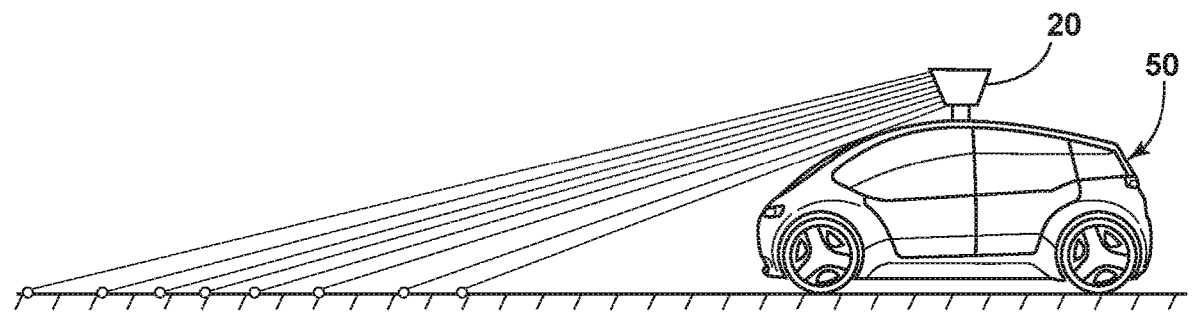
FIG. 2 is a perspective view of a vehicle having a LIDAR sensing unit mounted thereon, according to one embodiment.
Figure 3:
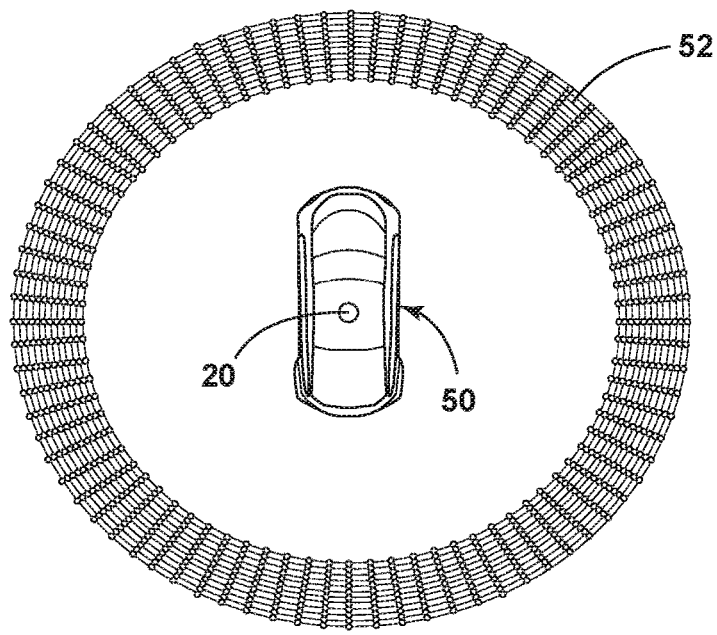
FIG. 3 is a top view of a vehicle and a pattern for the laser beams projected therefrom, in one embodiment.

FIG. 2 shows a vehicle 50 having a LIDAR sensing unit 20 mounted on a roof thereof. Eight laser beams are shown at downward angles from horizontal that project frontwardly from the vehicle 50. FIG. 3 is a top view of the vehicle 50 having the LIDAR sensing unit 20 and shows one pattern 52 of laser beams sensed upon rotations or spinning of the LIDAR sensing unit. The pattern 52 illustrated in FIG. 3 shows how the laser beams shift, however, a spiral pattern that retraces paths is contemplated. Further, the circles shown in the pattern 52 in FIG. 3 relate to points in time when sensing occurs in one embodiment. The pattern 52 is one embodiment. Other patterns are contemplated.

Planetary Gear Arrangement

Figure 4:
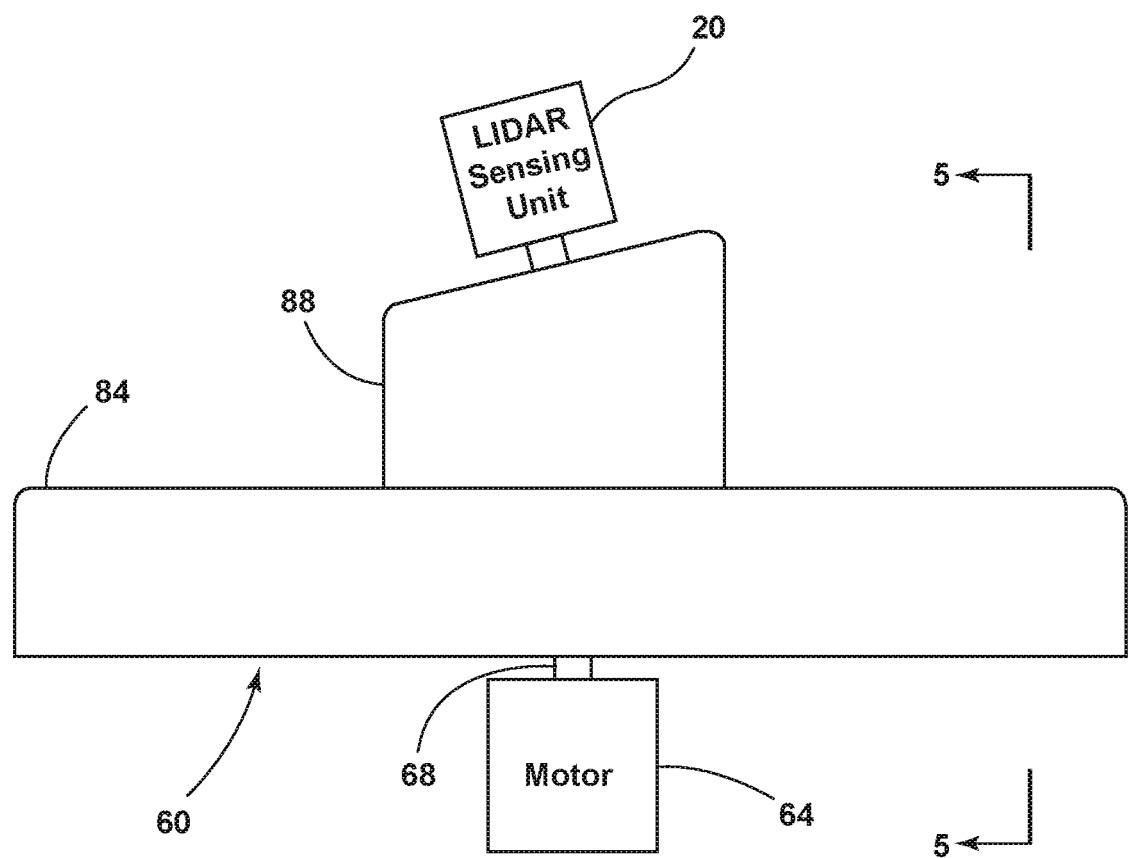
FIG. 4 is a front view of a planetary gear arrangement for rotating and oscillating the LIDAR sensing unit, in one embodiment.
Figure 5:
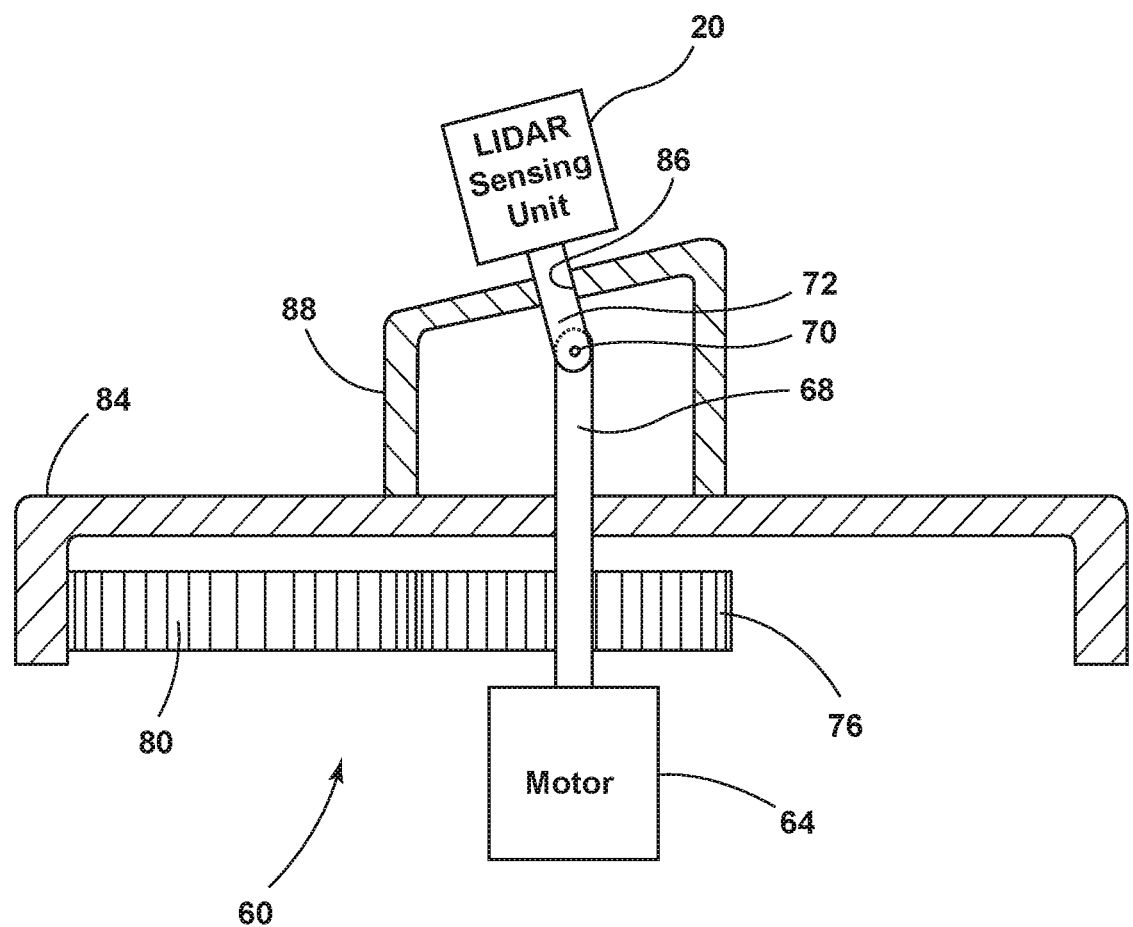
FIG. 5 is a cross-sectional view of the arrangement of FIG. 4.

FIGS. 4 and 5 show an embodiment including a planetary gear arrangement 60 having a motor 64 for rotatably driving a motor shaft 68. The cross-sectional view of FIG. 5 shows the motor shaft 68 universally connected by a universal joint 70 at one end to a shaft 72 supporting the LIDAR sensing unit 20. Thus, the shaft 72 is secured at a proximal end via the universal joint 70 to motor shaft 68. The motor shaft 68 also rotates a motor gear 76 that drives an intermediate gear 80. The intermediate gear 80 drives planetary gear 84 that has a linkage or support 88 with an open bore aperture defined as a sleeve 86 that receives the shaft 72 of the LIDAR sensing unit 20 therethrough. The planetary gear 84 is slower is it encloses the intermediate gear 80 and contacts only a portion of the intermediate gear due to its larger diameter and greater number of teeth. Therefore, the intermediate gear 80 completes a rotation about an entirety of a path before the planetary gear 84 having more teeth. As the planetary gear 84 slowly rotates, the support 88 is configured to move or rotate the LIDAR sensing unit 20 about the vehicle roof, and thus effectively oscillate or change the position thereof.

Operation of the rotary and oscillation control 34 powers the motor 64 to rotate/spin the LIDAR sensing unit 20 at a velocity greater than the speed of rotation of the support 88 and the sleeve 86 that receives and guides the orientation of the LIDAR sensing unit 20 in view of the movement of the support 88. The angle of the LIDAR sensing unit 20 is fixed in FIGS. 4 and 5. However, the effective angle various with the position of the LIDAR sensing unit 20 as the sensing unit moves about a circular path of travel upon a vehicle. The angle shown in FIGS. 4 and 5 is for purposes of illustration only. The actual variation in angle during effective oscillation or movement is less than 2 degrees in one embodiment, and about 1 degree in another embodiment, while other angles variations are contemplated. In the embodiment of FIGS. 4 and 5, the LIDAR sensing unit 20 moves about a path of center from horizontal that is fixed between 1 and 2 degrees downwardly oriented. Other angles are contemplated, such as from 1 to five degrees. The angle of the LIDAR sensing unit 20 relative to horizontal must not be confused with an angle of LIDAR sensors 30 or lasers 26 mounted on the LIDAR sensing unit 20.

Figure 6:
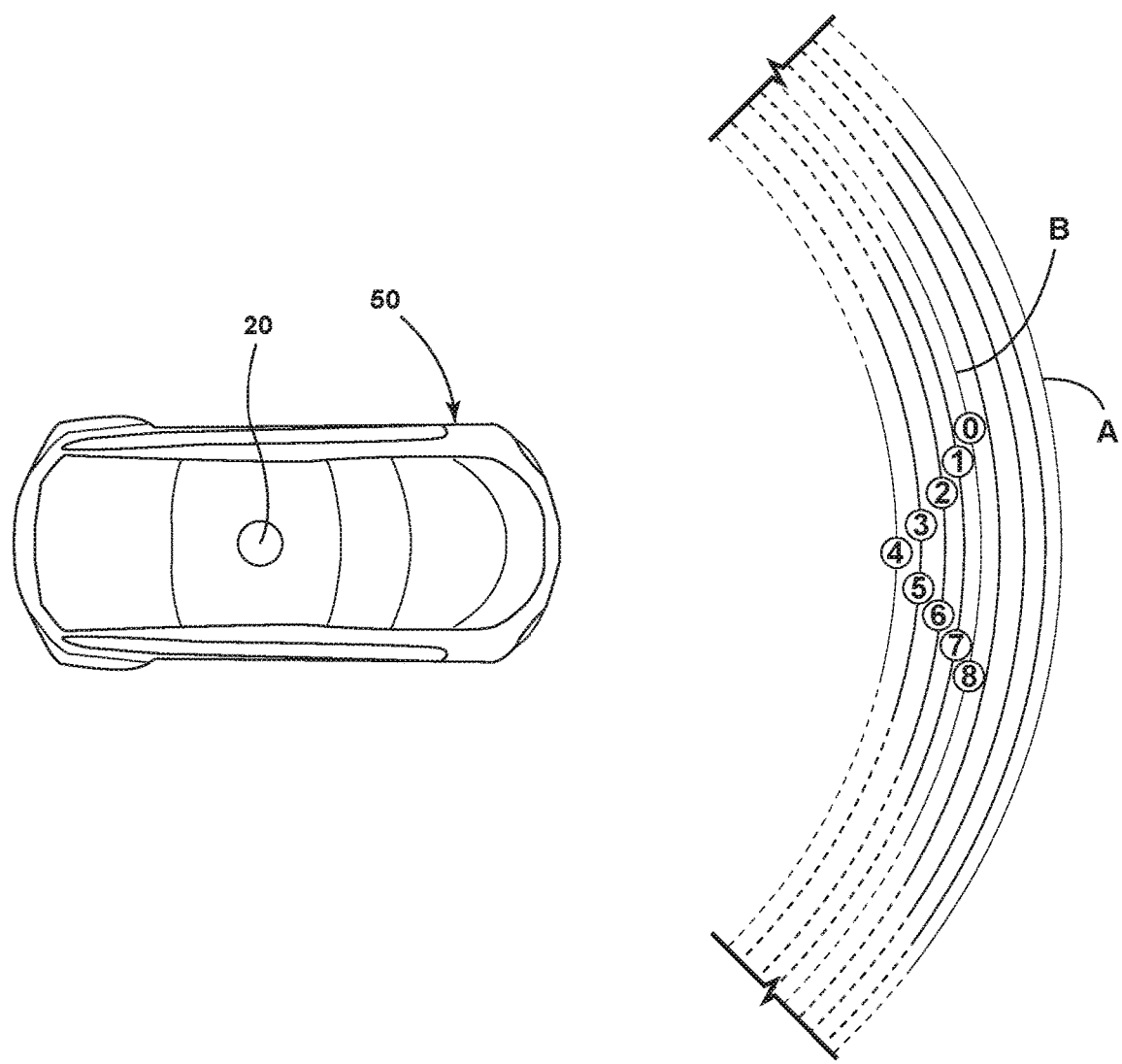
FIG. 6 is a top view of a vehicle and showing a portion of a pattern for the laser beams projected therefrom, according to some embodiments.

When the LIDAR sensing unit 20 in FIG. 5 is both spinning/rotating about the axis of the motor shaft 68, the axis of rotation is shifting or effectively oscillating due to movement of support 88 shifting the direction or orientation of the LIDAR sensing unit 20 and due to movement of the shaft 72 within the sleeve 86. In one embodiment, this motion creates a spiral path for the lasers 26 and the LIDAR sensors 30 of the LIDAR sensing unit 20, rather than circles. FIG. 6 shows how in one embodiment sensing by the LIDAR sensors 30 fills in the area between traditional LIDAR concentric circles 0, 4, 8 by an oscillating or shifting axis of rotation. For this example, the LIDAR sensing unit 20 rotates four times about an axis of the shaft 72 for a full axis oscillation cycle corresponding to a complete rotation of the support 88 upon the vehicle. The numbers in FIG. 6 represent the number of revolutions of the LIDAR sensing unit 20.

Thus, picture that the LIDAR sensing unit 20 is not only spinning, but the LIDAR axis of rotation is tilted/shifted slightly and rotating as well. This motion will create a path shape similar to overlapping spirals instead of concentric circles resulting in a spiral effect. The right side of FIG. 6 shows how this concept makes it possible to sense objects in the area between traditional LIDAR concentric circles. For this example shown in FIG. 6, the following considerations were made (specific parameter values are not linked/important to the overall concept). In FIG. 6, two of the lines A, B correspond to laser beam paths when the oscillation angle is 0 degrees and the motor shaft 68 and shaft 72 are in alignment. As the LIDAR sensing unit 20 rotates and the fixed offset oscillation angle moves away from a reference point, the shift in direction of the angle and the distance of the LIDAR sensing unit 20 changes toward and different degree further off axis, the laser beam B shift to the paths 1, then 2, then 3 and then 4 in sequence. Thereafter, the laser beam B shifts to paths 5, 6, 7 and 8 when returning to the initial position 0 for the laser beam B. At the same time, laser beam A shifts along a similar path toward laser beam B.

In the FIG. 6 embodiment, the LIDAR completes 8 rotations for every 1 axis oscillation cycle (750 revolutions per minute (RPM) vs 93.75 RPM) and eight rotations depict or correspond to about 640 milliseconds. In FIG. 5, the separation angle between LIDAR beams is 2° and the maximum oscillation angle for the axis of rotation is 1° off-axis. The cycle time of the LIDAR sensing unit 20 for gathering data is 1 millisecond, in one embodiment. Other embodiments with different oscillation cycles and separation angles are contemplated.

One effect of the 3D spinning LIDAR sensing unit 20 is improved resolution, especially for a stationary vehicle 50. A lower cost LIDAR sensing unit 20, having a large beam separation angle, is paired with an effectively oscillating or shifting axis of rotation to produce the mapping resolution of a LIDAR sensing unit 20 having a greater number of LIDAR sensors.

Operation of Planetary Gear Arrangement

Figure 7:
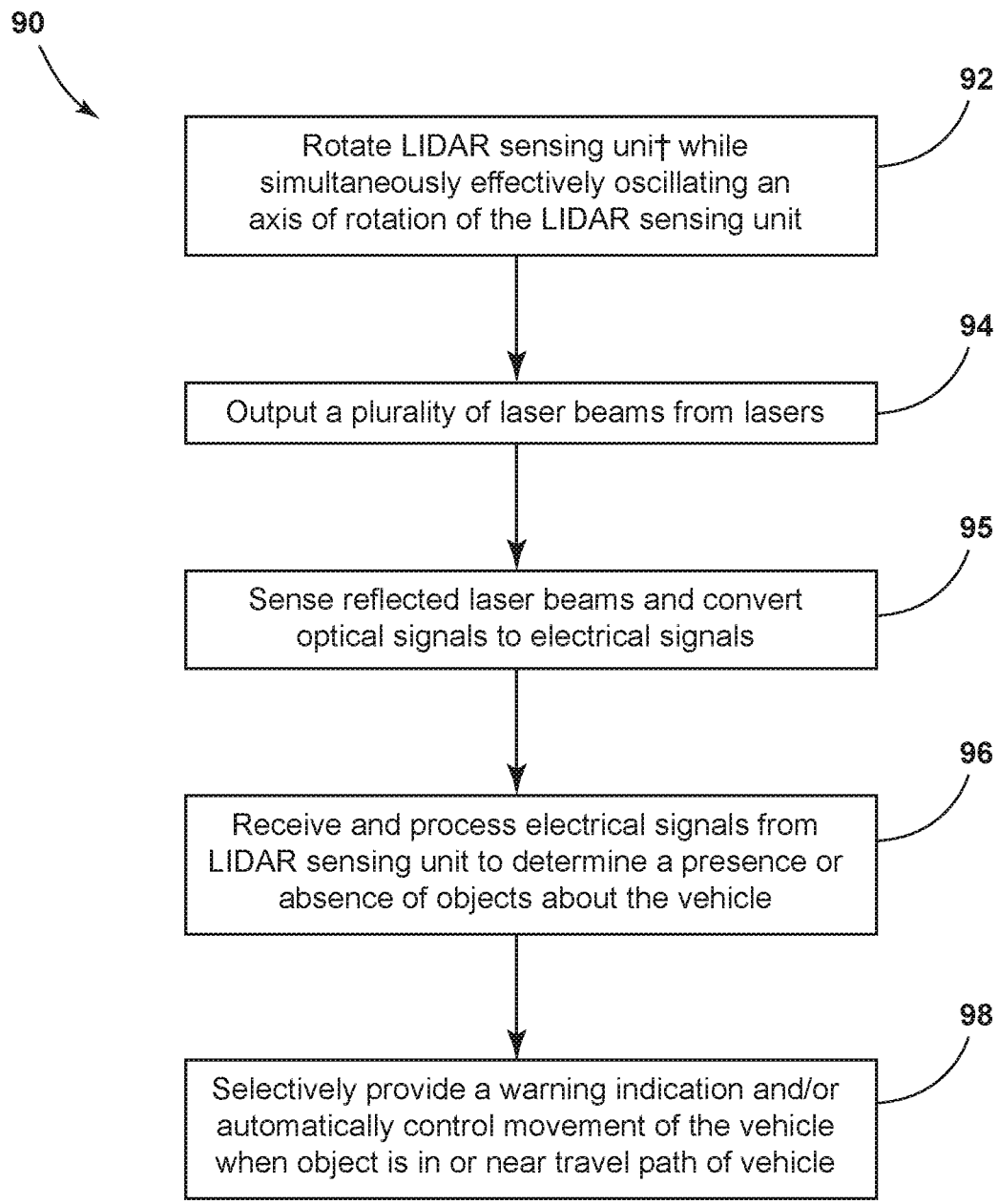
FIG. 7 is a flow chart showing operation of the planetary gear arrangement.

FIG. 7 is a flow chart 90 showing operation of the autonomous vehicle control system 16 including the LIDAR sensing unit 20. Initially, the electronic processor 22 is configured to operate the rotary and oscillation control 34 to drive the motor 64, which rotates the motor shaft 68 and shaft 72 to spin the LIDAR sensing unit 20, while the motor gear 76 of the motor shaft 68 simultaneously drives the planetary gear 84 to move the support 88 and shift or move the sleeve to oscillate the axis of rotation of the rotating LIDAR sensing unit 20 (step 92).

The electronic processor 22 provides a signal to the lasers 26, wherein at least three lasers 26 within the LIDAR sensing unit 20 output a laser beam (step 94). The LIDAR sensors 30 sense respective laser beams and optical signals are converted to electrical signals (step 95). The electronic processor 22 also receives, in real time, and processes electrical signals from the LIDAR sensors 30 to determine a presence or absence of objects about the vehicle (step 96).

After determining the existence of objects near the vehicle 50, the electronic processor 22 is programmed to provide a warning indication to a vehicle operator or to control movement of the vehicle by steering and/or braking to avoid an object (step 98) in or near a travel path of the vehicle.

Servomotor Arrangement

Figure 8:
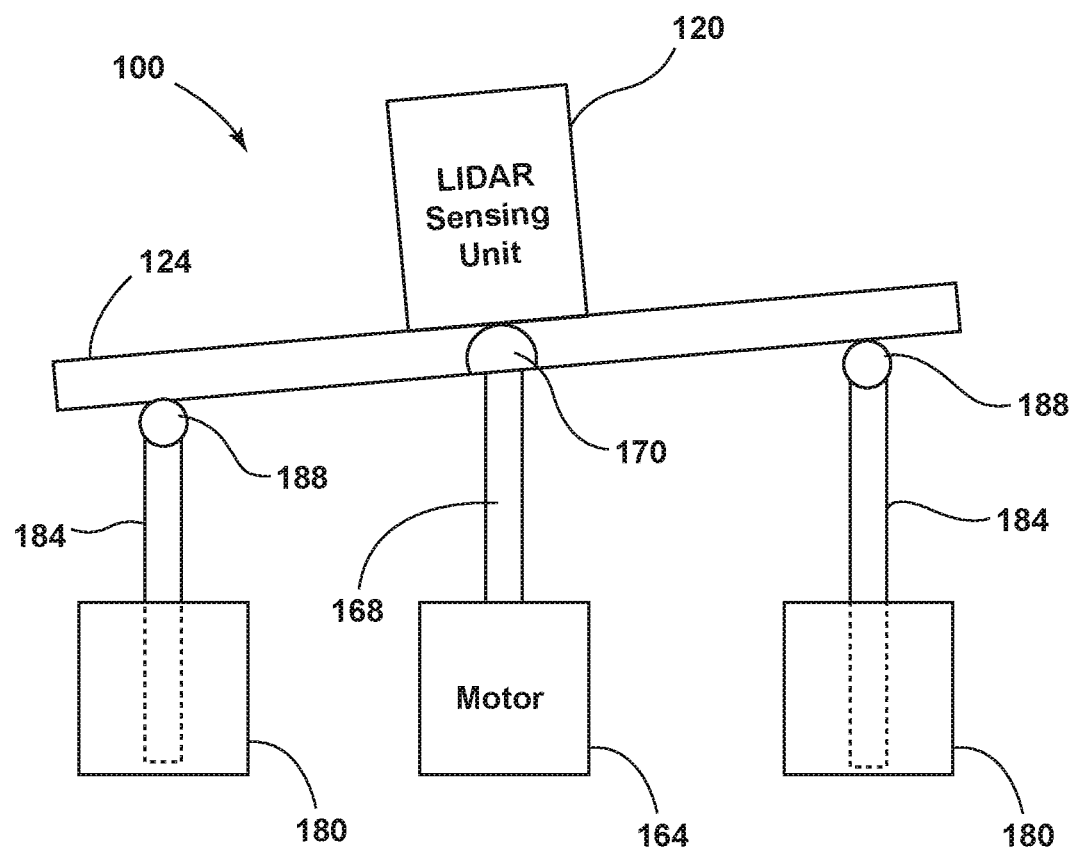
FIG. 8 is a front view of a servomotor arrangement for varying angle of a LIDAR sensing unit.

In another embodiment shown in FIG. 8, instead of a planetary gear arrangement, a servomotor arrangement 100 includes a LIDAR sensing unit 120 mounted on a variable angle plate 124. A motor 164 rotates a rotary shaft 168 that is connected to the variable angle plate 124 by a connector 170. The connector 170 allows rotation of the rotary shaft 168 to rotate or spin the variable angle plate 124. The connector 170 is jointed or hinged to allow tilting of the variable angle plate 124 in any direction. Servo motors 180 are powered to move linearly moving drive beams 184 in a linear direction upwardly or downwardly. In FIG. 8, the beam 184 on the right side is driven upwardly in a linear direction so that a bearing 188 tilts the variable angle plate 124 and thus, the LIDAR sensing unit 120 mounted thereon and to a roof of a vehicle. In one embodiment, the bearing 188 is rollable in any direction to allow rotation and movement of the variable angle plate 124 despite any tilting or oscillation thereof.

Figure 9:
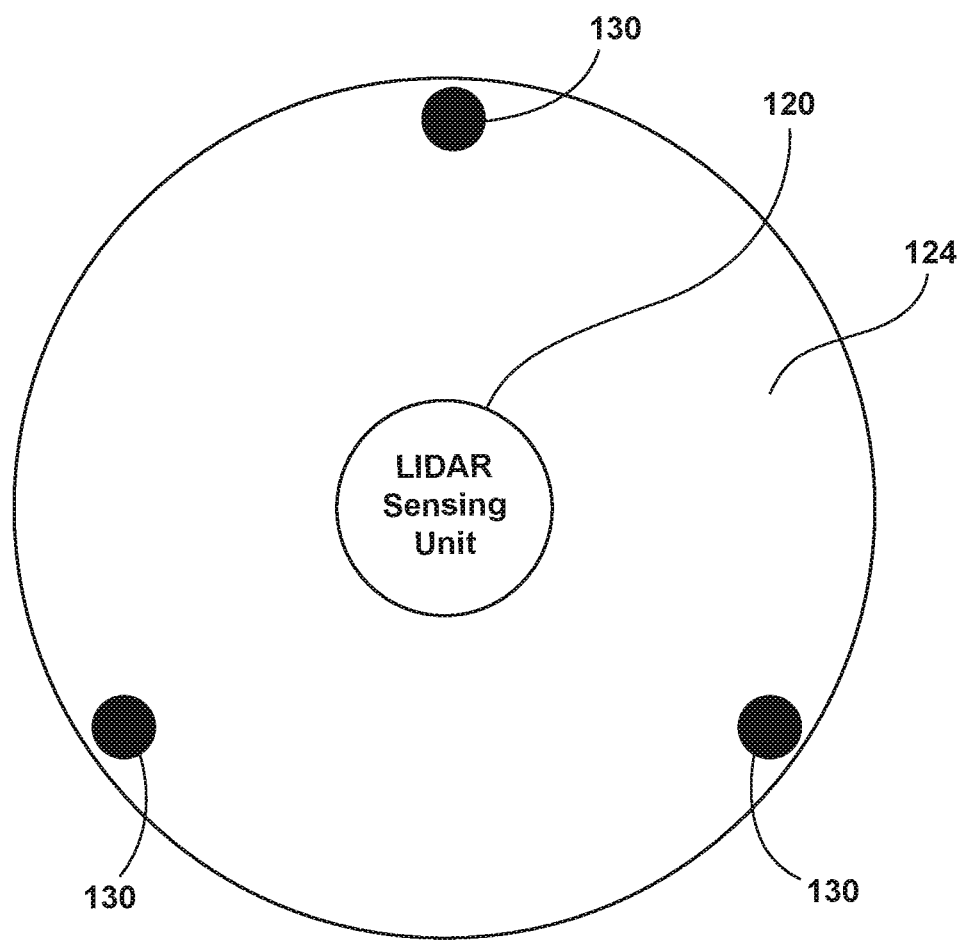
FIG. 9 is a top view of the LIDAR sensing unit and a plate supporting the sensing unit.

FIG. 9 shows a top view of the LIDAR sensing unit 120 and the variable angle plate 124. The spaced circles 130 on the variable angle plate 124 represent spaced areas below the plate where three beams 184 are driven toward or away from the bottom of the variable angle plate 124. The linear motion of the beams 184 upwardly and downwardly varies an angle of the axis of rotation of the variable angle plate 124 supporting the LIDAR sensing unit 20. Thus, the variable angle plate 124 provides a variation to the axis of rotation that improves a mapping resolution of the LIDAR sensing unit 20.

The rotary and oscillation control 34 shown in FIG. 1 controls the three motors 180 (two motors shown in FIG. 8) for the servomotor arrangement 100 shown in FIGS. 8 and 9. Rotary and oscillation control 34 operates to drive the motor 164 to rotate the rotary shaft 168, which is rotatably connected to the LIDAR sensing unit 120. Thus, the rotary shaft, through the connector 170 drives variable angle plate 124. In one embodiment, the drive beams 184 are sequentially raised and lowered, thus changing the direction of the LIDAR sensing unit 120 and oscillating the axis of rotation of the sensing unit during rotation thereof. This oscillating of the axis of rotation of the LIDAR sensing unit 120 causes the plurality of the laser beams to change an oscillation angle vertically so that the laser beams output from the lasers 26 move both vertically and horizontally during the rotation of the sensing unit. While the variable angle plate 124 moves or pivots about the connector 170, the variable angle plate does not move upwardly or downwardly at the connector 170. The connector 170 transfers rotation from the rotary shaft 168 to the variable angle plate 124, while allowing pivoting about the connector 170 for the rest of the variable angle plate 124 or shifting thereabout the connector 170.

The electronic processor 22 shown in FIG. 1 determines distances from the object detected from the signals provided by the LIDAR sensors 30. Further, the electronic processor 22 either knows the exact angle of the lasers 26 from information sent to the rotary and oscillation control 34 to control the position of the LIDAR sensing unit 20, 120 or receives feedback from the rotary and oscillation control 34 and/or the servomotors 180 thereof For the FIG. 8 arrangement to determine the exact offset angle of the lasers 26 with respect to a horizontal orientation.

This oscillation movement occurs as the bearings 188 roll to allow upward movement of the variable angle plate 124 when the beams 184 move upwardly. Likewise, when a different beam 184 moves upwardly another beam 184 moves downwardly. The offset motions cause various waves to form in the patterns shown in FIGS. 3 and 6, along with other patterns (not shown).

Operation of Servomotor Arrangement

Figure 10:
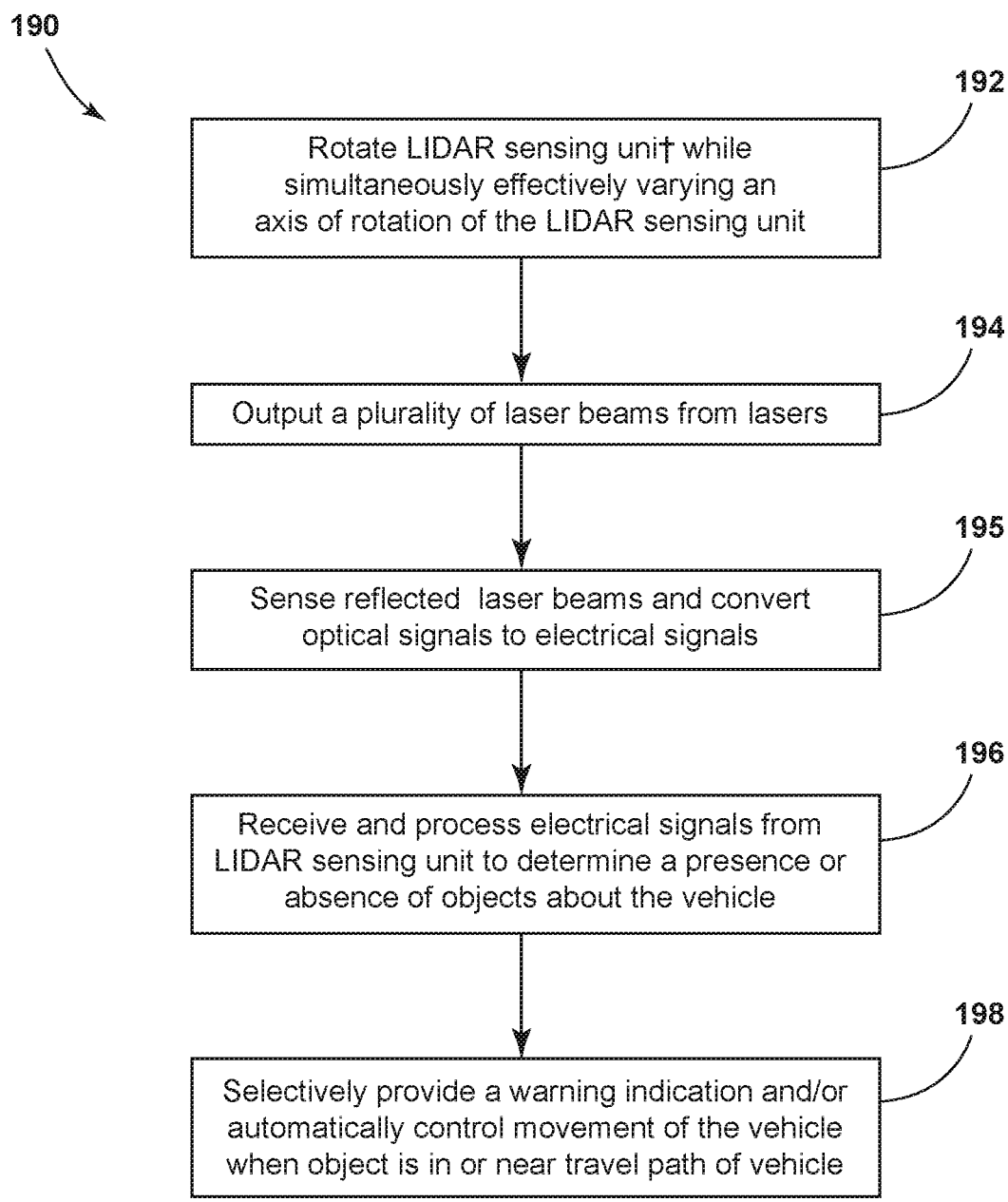
FIG. 10 is a flow chart showing operation of the servomotor arrangement.

FIG. 10 is a flow chart 190 showing operation of the autonomous vehicle control system 16 including the LIDAR sensing unit 120. Initially, the electronic processor 22 is configured to operate the rotary and oscillation control 34 to drive the motor 164, which rotates the rotary shaft 168, and to drive the servo motors 180 to move drive beams 184 in a linear direction to rotate and provide tilting/oscillating movement or otherwise varying an angle of the variable angle plate 124 and the LIDAR sensing unit 20 disposed thereon (step 192). This operation effectively varies an angle of the axis of rotation of the LIDAR sensing unit 20.

The electronic processor 22 also provides a signal to the lasers 26, wherein at least three lasers 26 within the LIDAR sensing unit 120 output a laser beam (step 194). The LIDAR sensors 30 sense respective laser beams and optical signals are converted to electrical signals (step 195). The electronic processor 22 also receives, in real time, and processes electrical signals from the LIDAR sensors 30 to determine a presence or absence of objects about the vehicle 50 (step 196).

After determining the existence of objects near the vehicle 50, the electronic processor 22 is programmed to provide a warning indication to a vehicle operator or to control movement of the vehicle 50 by steering and/or braking to avoid an object (step 198) in or near a travel path of the vehicle.

Other Embodiments

In one embodiment, the LIDAR sensing unit 20 is mounted about two meters above or off a ground surface and upon a roof of the vehicle 50. Further, three of a plurality of laser beams are angled towards the ground at 58°, 60°, and 62°, respectively. Thus, the laser beams output by the lasers 26 have a separation angle of 2° with respect to adjacent ones of the laser beams. In another embodiment, the plurality of laser beams are angled towards the ground at 55°, 60°, and 65°, respectively. Thus, the laser beams have a separation angle of 5° with respect to adjacent ones of the laser beams.

In one embodiment, the three of a plurality of laser beams are angled towards the ground at 58°, 60°, and 62°, respectively. Thus, the laser beams have a separation angle of 2° with respect to adjacent ones of the laser beams. In another embodiment, the plurality of laser beams are angled towards the ground at 55°, 60°, and 65°, respectively. When the laser beams have a separation angle of 5° with respect to adjacent ones of the laser beams, the beams are driven further to increase the oscillation or offset angle of the variable angle plate 124. Thus, the LIDAR sensing unit 20 is provided at a larger offset angle to provide a larger adjustment to the angle in view when the laser beams are spaced farther apart and reduced in number thereon. In this embodiment, the maximum oscillation or offset angle for the axis of rotation is 2.5° off-axis. Thus, the LIDAR sensing unit 20 is provided at a larger offset angle to provide a larger adjustment to the separation angle in view of the arrangement of lasers 26.

One effect of the 3D spinning LIDAR sensing unit 20 is improved resolution, especially for a stationary vehicle 50. A lower cost LIDAR sensing unit 20, having larger beam separation angles, is paired with an effectively oscillating or a shifting axis of rotation to produce the mapping resolution of a LIDAR sensing unit 20 having a larger number of LIDAR sensors 30.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments. For example, "electronic processors" and "controllers" as described in the specification can include standard processing components, such as one or more processors, one or more memory modules including non-transitory computer-readable medium, one or more input/output interfaces, and various connections (e.g., a system bus) connecting the components. The software may include instructions and algorithms for performing methods as described herein.

FIG. 2 shows eight laser beams provided from the LIDAR sensing unit 20. More or fewer laser beams are contemplated. FIG. 6 shows laser beams A, B that are shifted. While only two laser beams A, B that are shifted are illustrated in FIG. 6, an embodiment with three or more laser beams that are shifted by changes in the oscillation angle for the axis of rotation of the LIDAR sensing unit 20 are contemplated.

In one embodiment, the vehicle has a level sensor or accelerometer arrangement to determine a position of the vehicle relative to the ground and horizontal. For instance, when the vehicle is traveling up a hill or other tilted surface, that information is provided to the electronic processor 22 of the vehicle 50 so that the effect on mapping of the position of objects about the vehicle is properly accounted for.

Thus, the embodiments provide, among other things, various methods for operating a LIDAR sensing unit 20 to determine and map objects about a vehicle 50 and limiting the need for individual lasers 26 by varying an angle vertically of the lasers during rotation in a generally horizontal plane relative to the vehicle.

What is claimed is:

1. A method for sensing objects disposed about a vehicle including a plurality of LIDAR sensors and a plurality of lasers disposed in a LIDAR sensing unit mounted above the vehicle for autonomous driving, comprising:

outputting a plurality of laser beams from the plurality of lasers while rotating the LIDAR sensing unit about the vehicle and simultaneously effectively oscillating an axis of rotation of the LIDAR sensing unit;

receiving a reflection of the plurality of laser beams with the plurality of LIDAR sensors that receive the reflected laser beams and convert optical signals to electrical signals;

determining a presence or absence of objects from the electrical signals; and providing a warning indication to a vehicle operator or controlling movement of the vehicle in response to detection of objects in a path of the vehicle, wherein the effective oscillating of the axis of rotation of the LIDAR sensing unit causes the plurality of laser beams to change an oscillation angle vertically so that the plurality of laser beams move both vertically and horizontally during the rotation about the vehicle, and wherein the rotating and effective oscillating of the plurality of laser beams is provided by a planetary gear arrangement that includes a motor gear that is driven with a motor shaft that is powered by a motor, the motor gear communicating with an intermediate gear that drives a planetary gear that rotates slower than the intermediate gear, and wherein the planetary gear encloses the intermediate gear and the motor gear.

2. The method according to claim 1, wherein the planetary gear receives a support thereon, the support including a sleeve defined by an open bore aperture.

3. The method according to claim 2, wherein the LIDAR sensing unit is supported by a shaft extending through the open bore aperture and secured at an end to a distal end of the motor shaft by a universal joint, wherein the universal joint allows movement of the shaft in any direction while transferring rotation from the motor shaft to the shaft and to the LIDAR sensing unit mounted thereto.

4. A method for sensing objects disposed about a vehicle including a plurality of LIDAR sensors and a plurality of lasers disposed in a LIDAR sensing unit mounted above the vehicle for autonomous driving, comprising:
outputting a plurality of laser beams from the plurality of lasers while rotating the LIDAR sensing unit about the vehicle and simultaneously effectively oscillating an axis of rotation of the LIDAR sensing unit;
receiving a reflection of the plurality of laser beams with the plurality of LIDAR sensors that receive the reflected laser beams and convert optical signals to electrical signals;
determining a presence or absence of objects from the electrical signals; and
providing a warning indication to a vehicle operator or controlling movement of the vehicle in response to detection of objects in a path of the vehicle,
wherein the effective oscillating of the axis of rotation of the LIDAR sensing unit causes the plurality of laser beams to change an oscillation angle vertically so that the plurality of laser beams move both vertically and horizontally during the rotation about the vehicle,
wherein the rotating and effective oscillating of the plurality of laser beams is provided by a servomotor arrangement that includes a motor and a rotary shaft, the rotary shaft having a distal end secured to a variable angle plate by a connector, wherein the connector is a universal joint allowing pivoting of the variable angle plate in any direction while transferring rotation from the rotary shaft to the variable angle plate.

5. The method according to claim 4, wherein the LIDAR sensing unit is secured at a top center of the variable angle plate.

6. The method according to claim 5, the servomotor arrangement including at least one servomotor having a linearly moving drive beam for contacting the variable angle plate to oscillate or vary an angle for the variable angle plate.

7. The method according to claim 6, wherein the at least one servomotor includes three of the servomotors each having a linearly moving drive beam for oscillating or varying the angle for the variable angle plate.

8. An object sensing system for a vehicle comprising:
a LIDAR sensing unit mounted above the vehicle, including:
at least three lasers for outputting at least three laser beams;
at least three LIDAR sensors, the at least three LIDAR sensors receiving a reflection of at least three laser beams and converting optical signals to electrical signals;
a servomotor arrangement for the rotating and effective oscillating of the at least three laser beams including a motor configured to drive a rotary shaft, the rotary shaft having a distal end secured to a variable angle plate by a connector, the connector including a universal joint allowing pivoting of the variable angle plate in any direction while transferring rotation from the rotary shaft to the variable angle plate, and
a LIDAR electronic processor configured to:
operate the at least three lasers to provide at least three laser beams,
operate a rotary and oscillation control to rotate the LIDAR sensing unit and simultaneously effectively oscillate or shift an axis of rotation of the LIDAR sensing unit,
receive the electrical signals from the at least three LIDAR sensors and, in combination with the effective oscillations of the LIDAR sensing unit, determine a presence or an absence of objects from the electrical signals and a mapping location of objects based on an angle of the LIDAR sensors and an offset angle for the axis of rotation of the LIDAR sensing unit; and
provide a warning signal to at least one of a vehicle warning indicator and an autonomous vehicle controller in response to detection of objects in a path of the vehicle.

9. The object sensing system according to claim 8, wherein the effective oscillating of the axis of rotation of the LIDAR sensing unit causes at least three laser beams to change an oscillation angle with respect to vertical so that at least three laser beams move vertically during rotation about the vehicle to create a spiral effect.

10. An object sensing system for a vehicle comprising:
a LIDAR sensing unit mounted above the vehicle, including:
at least three lasers for outputting at least three laser beams;
at least three LIDAR sensors, the at least three LIDAR sensors receiving a reflection of at least three laser beams and converting optical signals to electrical signals; and
a LIDAR electronic processor configured to:
operate the at least three lasers to provide at least three laser beams,
operate a rotary and oscillation control to rotate the LIDAR sensing unit and simultaneously effectively oscillate or shift an axis of rotation of the LIDAR sensing unit,
receive the electrical signals from the at least three LIDAR sensors and, in combination with the effective oscillations of the LIDAR sensing unit, determine a presence or an absence of objects from the electrical signals and a mapping location of objects based on an angle of the LIDAR sensors and an offset angle for the axis of rotation of the LIDAR sensing unit; and
provide a warning signal to at least one of a vehicle warning indicator and an autonomous vehicle controller in response to detection of objects in a path of the vehicle,
wherein a planetary gear arrangement provides for the rotating and the effective oscillating of the at least three laser beams, the planetary gear arrangement including a motor gear that is driven with a motor shaft that is powered by a motor, the planetary gear arrangement including an intermediate gear that is driven by the motor gear and a slower planetary gear that is driven by the intermediate gear, and
wherein the planetary gear encloses the intermediate gear and the motor gear.

11. The object sensing system according to claim 10, wherein the planetary gear arrangement including a support having a sleeve defined by an open bore aperture.

12. The object sensing system according to claim 11, including a shaft extending through the open bore aperture and secured at a proximal end to the motor shaft by a universal joint, the shaft being fixedly secured at a distal end to the LIDAR sensing unit, wherein the universal joint allows movement of the shaft in any direction while transferring rotation from the motor shaft to the shaft and the LIDAR sensing unit.

13. The object sensing system according to claim 8, wherein the LIDAR sensing unit is secured at a top center of the variable angle plate.

14. The object sensing system according to claim 12, the servomotor arrangement including at least one servomotor having a linearly moving drive beam for contacting the variable angle plate to oscillate or vary an angle for the variable angle plate.

15. The object sensing system according to claim 14, wherein the at least one servomotor includes three of the servomotors each having a linearly moving drive beam for oscillating or varying an angle for the variable angle plate.

16. The object sensing system according to claim 8, wherein the LIDAR sensing unit includes the at least three lasers that provide the at least three laser beams that are angled towards a ground surface at 58°, 60°, and 62°, respectively when the oscillation angle for the axis of rotation is 0 degrees.

* * * * *